(12) United States Patent
Modave et al.

(10) Patent No.: US 11,669,392 B2
(45) Date of Patent: Jun. 6, 2023

(54) NON-VOLATILE MEMORY

(71) Applicant: Proton World International N.V., Diegem (BE)

(72) Inventors: Jean-Louis Modave, Ottignies (BE); Guillaume Docquier, Waremme (BE)

(73) Assignee: Proton World International N.V., Diegem (BE)

( * ) Notice: Subject to any disclaimer, the term of this patent is extended or adjusted under 35 U.S.C. 154(b) by 52 days.

(21) Appl. No.: 17/360,204

(22) Filed: Jun. 28, 2021

(65) Prior Publication Data
US 2021/0326202 A1 Oct. 21, 2021

Related U.S. Application Data

(62) Division of application No. 16/261,182, filed on Jan. 29, 2019, now Pat. No. 11,061,760.

(30) Foreign Application Priority Data

Feb. 5, 2018 (FR) ...................................... 1850927

(51) Int. Cl.
*G06F 11/00* (2006.01)
*G06F 11/10* (2006.01)
*G06F 16/907* (2019.01)
*G06F 12/0802* (2016.01)

(52) U.S. Cl.
CPC ...... *G06F 11/1004* (2013.01); *G06F 11/1048* (2013.01); *G06F 12/0802* (2013.01); *G06F 16/907* (2019.01)

(58) Field of Classification Search
CPC ............. G06F 11/1004; G06F 11/1048; G06F 16/907; G06F 12/0802; G06F 3/0604; G06F 3/0629; G06F 3/0679
USPC .......................... 714/755, 758, 763, 764, 807
See application file for complete search history.

(56) References Cited

U.S. PATENT DOCUMENTS

| | | | | |
|---|---|---|---|---|
| 2006/0248585 A1* | 11/2006 | Ward | ................... | G06F 21/6218 726/20 |
| 2008/0195900 A1* | 8/2008 | Chang | .................. | G11C 7/1006 714/718 |
| 2009/0037767 A1 | 2/2009 | Shiota et al. | | |
| 2011/0271164 A1* | 11/2011 | Ahn | ..................... | G06F 11/1048 714/752 |
| 2011/0276858 A1* | 11/2011 | Tarui | ..................... | G06F 3/0673 714/763 |
| 2012/0072798 A1* | 3/2012 | Unesaki | .............. | G06F 11/1012 714/E11.023 |
| 2012/0159286 A1 | 6/2012 | Koshiyama | | |

(Continued)

FOREIGN PATENT DOCUMENTS

| | | |
|---|---|---|
| CN | 1571069 A | 1/2005 |
| CN | 102568603 A | 7/2012 |
| CN | 107077430 A | 8/2017 |

*Primary Examiner* — Albert Decady
*Assistant Examiner* — Osman M Alshack
(74) *Attorney, Agent, or Firm* — Slater Matsil, LLP

(57) ABSTRACT

A method of managing a non-volatile memory includes during a data writing process, selecting, by a program triggering the data writing process, an error detection and correction code from among two codes depending on a type of information being written. The information is written into the non-volatile memory, where the information is associated with the selected error detection and correction code.

20 Claims, 1 Drawing Sheet

(56) References Cited

U.S. PATENT DOCUMENTS

| | | | |
|---|---|---|---|
| 2012/0317463 A1* | 12/2012 | Sugahara | G06F 11/10 |
| | | | 714/E11.032 |
| 2013/0318418 A1* | 11/2013 | Bedeschi | G11C 29/028 |
| | | | 714/E11.032 |
| 2014/0201601 A1* | 7/2014 | Sato | G06F 3/0619 |
| | | | 714/773 |
| 2015/0318871 A1* | 11/2015 | Hoekstra | H03M 13/35 |
| | | | 714/763 |
| 2017/0116070 A1 | 4/2017 | Alrod et al. | |
| 2017/0147499 A1* | 5/2017 | Mohan | G06F 3/0631 |
| 2017/0255509 A1* | 9/2017 | Tsuboi | G06F 11/1016 |
| 2017/0293513 A1 | 10/2017 | Shinbashi et al. | |
| 2017/0322842 A1* | 11/2017 | Iwaki | G06F 12/16 |
| 2018/0293025 A1* | 10/2018 | Sakai | G11C 29/52 |

\* cited by examiner

NON-VOLATILE MEMORY

CROSS-REFERENCE TO RELATED APPLICATIONS

This application is a divisional of U.S. patent application Ser. No. 16/261,182, filed Jan. 29, 2019, now issued as U.S. Pat. No. 11,061,760, which claims priority to French Patent Application No. 1850927, filed on Feb. 5, 2018 which applications are hereby incorporated herein by reference.

TECHNICAL FIELD

The present disclosure generally relates to electronic circuits and systems and, more specifically, to circuits and systems using a non-volatile memory.

BACKGROUND

The storage of information (data and programs) in a non volatile memory, for example, a flash memory, has various constraints due to the granularity of the performed operations (writing, reading, erasing).

It further has to be ensured that the storage is not only correct (that there is no error during the storage) but also that it is reliable over time and does not drift. Error-correction mechanisms thus have to be associated with the storage in the memory.

In certain applications, is it desired to ascertain that the transactions performed and stored fulfill an atomicity criterion. The atomicity of a transaction corresponds to ascertaining that data stored in a memory effectively are in a processable state. This amounts to ascertaining that data in the non-volatile memory are either in the state prior to the transaction or in the state following the concerned transaction, but that they are not in an intermediate state. Error correction mechanisms based on error correction codes then have to respect the atomicity criterion.

SUMMARY

In one embodiment, a method of managing a non-volatile memory includes during a data writing process, selecting, by a program triggering the data writing process, an error detection and correction code from among two codes depending on a type of information being written; and writing information into the non-volatile memory, the information being associated with the selected error detection and correction code.

In another embodiment, a controller of a non-volatile memory is configured to receive information to be written and a control signal indicating a write operation and receive logical address to access memory corresponding to the write operation and convert the logical address to a physical address of the memory. The controller is further configured to select an error detection and correction code from among two codes depending on a type of the information being written into the memory, and write the information into the non-volatile memory at the physical address. The information is associated with the selected error detection and correction code.

In another embodiment, non-volatile memory comprises array of non-volatile storage memory cells and a memory controller managing operations of reading and writing information in a memory plane of the array according to logic addresses supplied from outside by converting logic addresses into physical addresses of the memory plane. The memory controller is configured to receive information to be written and a control signal indicating a write operation, receive logical address to access memory corresponding to the write operation and convert the logical address to a physical address of the memory. The memory controller is further configured to select an error detection and correction code from among two codes depending on a type of the information to be written into the memory; and write the information into the non-volatile memory, the information being associated with the selected error detection and correction code.

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
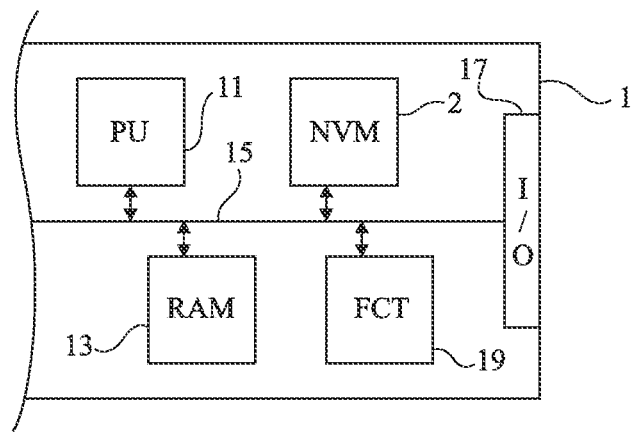
FIG. 1 very schematically shows, in the form of blocks, an embodiment of an electronic circuit of the type to which the embodiments which will be described apply.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the embodiments which will be described have been shown and will be detailed. In particular, the applications of a non-volatile memory with an error detection and correction code have not been detailed, the described embodiments being compatible with usual applications.

An embodiment overcomes all or part of the drawbacks of mechanisms of storage in a non-volatile rewritable memory. An embodiment provides a mechanism improving the reliability of the stored data in terms of error correction. An embodiment provides a non-volatile memory management method, wherein the stored information may be associated with an error detection and correction code selected from among two codes, the code selection being performed, during the writing, by the program triggering the writing. According to an embodiment, the memory is organized in pages corresponding to the erase granularity, a same page containing information associated with each of the two codes. According to an embodiment, the code selection conditions the length of the word stored in the memory. According to an embodiment, the code selection is performed each time an information is written into the memory. According to an embodiment, a first code comprises fourteen bits and is associated with a sixty-four-bit word and a second code comprises seven bits and is associated with a thirty two-bit word. According to an embodiment, data over thirty-two bits, manipulated by instructions of a program, are stored with the first code. According to an embodiment, metadata manipulated by a program are stored with the second code. According to an embodiment, the position in the memory of the information associated with the error detection and correction codes is independent from the selected code.

An embodiment provides a non-volatile memory controller. An embodiment provides a non-volatile memory.

FIG. 1 schematically illustrates, in the form of blocks, an embodiment of an electronic circuit 1 of the type to which the described embodiments apply.

The circuit 1 comprises a processing unit 11 (PU), for example, a state machine, a microprocessor, a programmable logic circuit, etc. The circuit 1 may include one or a plurality of volatile storage areas 13 (RAM), for example of RAM or register type, to temporarily store information (instructions, addresses, data) during the processing. The circuit 1 may include one or a plurality of non-volatile storage areas (NVM), for example, a flash-type memory 2 for durably storing information, in particular when the circuit is not powered. The circuit 1 may include one or a plurality of data, address, and/or control buses 15 between the different elements internal to circuit 1. The circuit 1 may include an input/output interface 17 (I/O), for example, of serial bus type, of communication with the outside of circuit 1.

Further, circuit 1 may integrate other functions, symbolized by a block 19 (FCT), according to the application, for example, a crypto-processor, other interfaces such as, for example, near field communication (NFC) interfaces, other memories, etc.

Figure 2:
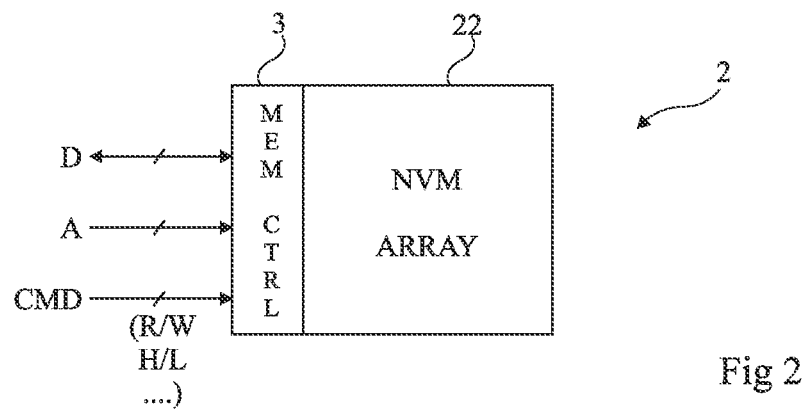
FIG. 2 very schematically shows, in the form of blocks, a rewritable non-volatile memory of the type to which the embodiments which will be described apply.

FIG. 2 schematically illustrates, in the form of blocks, a rewritable non-volatile memory 2 of the type to which the described embodiments apply.

Memory 2 mainly comprises an array 22 (NVM ARRAY) of non-volatile storage memory cells, where the storage is organized in pages and words, and a memory controller 3 (MEM CTRL) having the function of managing operations of reading and writing information D (data and program) in the memory plane according to addresses A supplied from the outside (typically, by processing unit 11, FIG. 1). In particular, controller 3 converts logic addresses supplied by the applications desiring to access the memory into physical addresses of memory plane 22. The memory communicates with the outside, via memory controller 3, which receives not only the logic addresses, but also control signals (CMD), among which a read or write instruction R/W according to the task to be executed.

In applications targeted by the present description, memory controller 3 also has the function of detecting and, if possible, of correcting, possible errors in the stored information. This function is, for memory space reasons, configured according to the nature of the information stored in the memory. Thus, among the control bits received by the memory, a bit H/L conditions the error detection and correction code used. More specifically, this bit selects the integrity level of the stored information.

A write instruction originating, for example, from the processing unit 11, is accompanied by an indicator of the desired integrity level (low (L) or high (H)). The notion of high and low is relative and refers relative to the other integrity level. The low level corresponds to a relatively low integrity level as compared with the high level, which is a relatively high level.

In current memories, the memory is divided into two respective low-integrity and high-integrity areas. The integrity level conditions the size of the error detection and correction code (EDC/ECC—Error Detection Code/Error Correction Code). The memory controller then selects the integrity level according to the storage address with respect to the limit between the two areas.

The selection of the error correction code depends on the application and, in particular, on the size of the physical word of the non-volatile memory, on the number of bits desired for the logic words. More particularly, in applications targeted by the present disclosure, the error detection/correction code (EDC/ECC) used is of linear type, which leads to adding 7 EDC/ECC bits to each 32-bit word and adding 14 EDC/ECC code bits to each 64-bit word.

The code of the 64-bit words corresponds to a high integrity since the length of the 14-bit code for 64 bits enables to detect with a better probability errors of 2 bits and more than with a 7-bit code for 32 bits.

In practice, the high-integrity memory area is limited to the storage of programs while the actual data as well as the metadata (flags, etc.) are stored in the low-integrity area. Indeed, the fact for the addresses assigned to high-integrity and low-integrity storage to be set makes a high-integrity data storage inefficient in practice since all the data and metadata to be stored in high integrity would then have to be coded over 64 bits. Now, metadata may be a simple i-bit flag and storing it in the 64-bit granularity area is not desirable. However, for data which are generally 32-bit words and which are seldom isolated (often a plurality of 32-bit data words may be stored at the same time), storing the data in high integrity would improve their reliability.

Further, in a memory organized in pages and, in particular in a flash-type memory where the writing and the reading are carried out in bytes but where the erasing is necessarily carried out in full pages (the page is defined as corresponding to the memory erase granularity), it is desired to store on the one hand the code (less frequently updated than the data) in different pages than the data and the metadata, which are more frequently modified. It is thus preferable to keep the distinction between a code, on the one hand, and data/metadata on the other hand in terms of storage pages. This particularly simplifies the atomicity management in such a memory.

It is thus provided to make the selection between high integrity and low integrity versatile across the entire memory plane. Thus, on writing of information into the memory, the application (the program executed by the processing unit) selects the desired integrity level by setting flag H/L to one state or another.

This enables to dissociate, among the information which generally does not belong to the program and which is usually stored in low integrity, data from metadata, and to thus store the data in high integrity without for this to require also storing the metadata therein.

Figure 3:
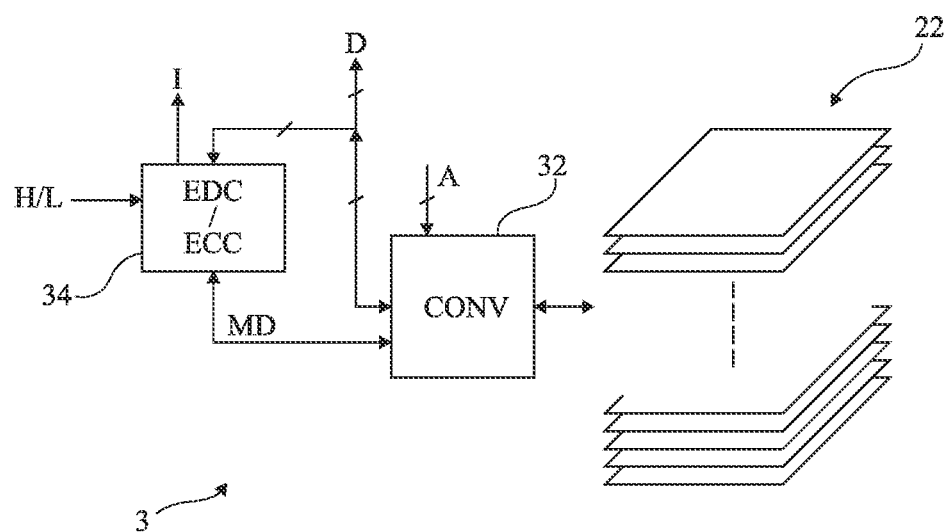
FIG. 3 shows an embodiment of an error detection and correction processing.

FIG. 3 shows an embodiment of an error detection and correction processing.

The drawing partially and schematically shows a more detailed view of certain parts of memory controller 3 of memory 2 of FIG. 2.

Memory plane 22 is also organized in pages where the information is stored in words of at least thirty-two bits. According to the described embodiments, the choice between 32 and 64-bit words depends on the desired integrity level.

Memory controller 3 comprises, among others, an address converter 32 (CONV) having the function of converting logic addresses A supplied from the outside into physical addresses in the memory plane and of concatenating, in write mode, the stored information to the error detection and correction code, and of dissociating them in read mode. Controller 3 also comprises a circuit 34 (EDC/ECC) or processor for calculating the EDC/ECC error detection and correction code. The parity control bit is calculated circuit 34 or by converter 32.

In write mode, the information to be stored and the corresponding addresses originate from the outside. The write instruction is associated with, preferably preceded by, an instruction for updating a register of controller 3 storing the state of integrity level selection bit H/L. The information D to be stored is not only sent to converter 32, but also to circuit 34. Circuit 34 calculates, according to the state of bit H/L, the EDC/ECC code over 7 or 14 bits and supplies the calculated code to converter 32 so that it is stored as metadata MD of the corresponding word.

In read mode, the information and the corresponding EDC/ECC code are extracted from memory plane 22. Circuit 34 verifies the integrity of the information based on error detection and correction code MD. Circuit 34 supplies, with information D, an indicator I of the reliability of the supplied information. According to whether or not there are errors and according to whether or not they can be repaired with the associated code, indicator I outputs a state indicating that the supplied data are reliable or not.

In practice, a high-integrity storage of the programs is kept. In particular, the instructions of a program are generally mainly executed successively and it is then not disturbing to provide grouping the words by two to perform a coding over 64-bit words.

As for the actual data (the variables manipulated by the programs), it is now also possible to store them in high integrity without adversely affecting a low-integrity storage of metadata such as flags, state indicators, etc., which remain stored in high integrity.

Preferably, the data and the metadata however remain stored in the same pages, that is, low and high integrity are mixed in a same page. An advantage is that this preserves the page erasing granularity with data and metadata in certain pages and the code in other pages, while keeping an easy atomicity management with data and metadata mixed in the same pages.

The implementation of the described embodiments requires no modification of usual memories and of their controllers. Advantage is here taken from the fact that memory controllers already receive a flag supplied by the processor to condition the integrity level. It is thus sufficient to modify the storage program in the memory to condition the change of integrity level on the fly as the program develops according to the nature of the data to be stored.

An advantage of the described embodiments is that they improve the error management in a non-volatile memory, preferably a flash memory.

An advantage of the described embodiments is that they require no modification of existing memories and of their memory controllers.

An advantage of the described embodiments is that they are compatible with usual atomicity mechanisms. Indeed, their implementation does not intervene on atomicity mechanisms.

An advantage of the described embodiments is that they enable to select a different EDC/ECC code according to the nature of the data, even independently from the size thereof. Thus, during the storage of the 32-bit data words, it may be chosen for some to be stored in low integrity and for others to be stored in high integrity (for example, for more critical data which are desired to be more reliable).

An advantage induced by the described embodiments is that their implementation improves the security of the stored data against piracy attempts. Indeed, the data are now no longer confined in pages assigned to the low-integrity area but are mixed in the high-integrity area. Accordingly, it becomes more difficult for an attacker to isolate them.

Although reference has been made to specific EDC/ECC codes, any adapted error detection and correction code may be provided, by providing a code providing a higher integrity (in terms of capacity of correction of the number of erroneous bits) as compared with a code of relatively lower integrity.

Various embodiments have been described. Various alterations, modifications, and improvements will readily occur to those skilled in the art. Further, the practical implementation of the described embodiments is within the abilities of those skilled in the art based on the functional indications given hereabove and by using circuits usual per se. Particularly, the organization of the memory addressing and the generation of the signals adapted to the control of said memory and to this addressing use techniques usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A controller of a non-volatile memory configured to:
receive information to be written and a control signal indicating a write operation;
receive an integrity bit indicating a high integrity or low integrity, the integrity bit being indicative of a type of information being written into the non-volatile memory, the type of information being metadata or data or instructions of a program, wherein the integrity bit is a low integrity bit when the type of information is metadata, and the integrity bit is a high integrity bit when the type of information is data or instructions of a program;
receive a logical address to access memory corresponding to the write operation and convert the logical address to a physical address of the non-volatile memory;
select an error detection and correction code from among two codes depending on the integrity bit; and
write the information into the non-volatile memory at the physical address, the information being associated with the selected error detection and correction code wherein the non-volatile memory is organized in pages corresponding to an erase granularity, a same page comprising information associated with each of the two codes, wherein the data and the metadata are written in a different set of pages than the instructions of the program, and selecting the error detection and correction code is performed each time the information is written into the non-volatile memory.

2. The controller of claim 1, wherein selecting the error detection and correction code conditions a length of a word stored in the non-volatile memory.

3. The controller of claim 1, wherein a first code of the two codes comprises fourteen bits and is associated with a sixty-four-bit word and a second code of the two codes comprises seven bits and is associated with a thirty two-bit word.

4. The controller of claim 3, wherein the information being written comprises data over thirty two bits, wherein the data is associated with the first code.

5. The controller of claim 3, wherein the information being written comprises metadata, wherein the metadata is associated with the second code.

6. The controller of claim 1, wherein the physical address for the information being written is independent from the selected error detection and correction code.

7. The controller of claim 1, wherein the controller is further configured to:
detect and correct, errors in the information stored in the non-volatile memory based on the selected error detection and correction code.

8. A non-volatile memory comprising:
an array of non-volatile storage memory cells; and
a memory controller managing operations of reading and writing information in a memory plane of the array according to logic addresses supplied from outside by converting logic addresses into physical addresses of the memory plane, the memory controller being configured to
receive information to be written and a control signal indicating a write operation;
receive an integrity bit indicating a high integrity or low integrity, the integrity bit being indicative of a type of information being written into the non-volatile memory, the type of information being metadata or data or instructions of a program, wherein the integrity bit is a low integrity bit when the type of information is metadata, and the integrity bit is a high integrity bit when the type of information is data or instructions of a program
select an error detection and correction code from among two codes depending on the integrity bit; and
write the information into the non-volatile memory, the information being associated with the selected error detection and correction code wherein the non-volatile memory is organized in pages corresponding to an erase granularity, a same page comprising information associated with each of the two codes, wherein the data and the metadata are written in a different set of pages than the instructions of the program, and selecting the error detection and correction code is performed each time the information is written into the non-volatile memory.

9. The non-volatile memory of claim 8, wherein selecting the error detection and correction code conditions a length of a word stored in the non-volatile memory.

10. The non-volatile memory of claim 8, wherein a first code of the two codes comprises fourteen bits and is associated with a sixty-four-bit word and a second code of the two codes comprises seven bits and is associated with a thirty two-bit word.

11. The non-volatile memory of claim 10, wherein the information being written comprises data over thirty two bits, wherein the data is associated with the first code.

12. The non-volatile memory of claim 10, wherein the information being written comprises metadata, wherein the metadata is associated with the second code.

13. The non-volatile memory of claim 8, wherein a physical address for the information being written is independent from the selected error detection and correction code.

14. The non-volatile memory of claim 8, wherein the memory controller is further configured to:
detect and correct, errors in the information stored in the non-volatile memory based on the selected error detection and correction code.

15. A controller of a non-volatile memory configured to
receive information to be written and a control signal indicating a write operation;
receive an integrity bit indicating a high integrity or low integrity, the integrity bit being indicative of a type of information being written into the non-volatile memory, the type of information being metadata or data or instructions of a program, wherein the integrity bit is a low integrity bit when the type of information is metadata, and the integrity bit is a high integrity bit when the type of information is data or instructions of a program;
receive a logical address to access memory corresponding to the write operation and convert the logical address to a physical address of the non-volatile memory;
select an error detection and correction code from among two codes depending on the integrity bit; and
write the information into the non-volatile memory at the physical address, the information being associated with the selected error detection and correction code wherein the non-volatile memory is organized in pages corresponding to an erase granularity, a same page comprising information associated with each of the two codes, wherein the data and the metadata are written in a same page comprising information associated with each of the two codes, and selecting the error detection and correction code is performed each time the information is written into the non-volatile memory.

16. The controller of claim 15, wherein a first code of the two codes comprises fourteen bits and is associated with a sixty-four-bit word and a second code of the codes comprises seven bits and is associated with a thirty two-bit word.

17. The controller of claim 16, wherein the information being written comprises data over thirty two bits, wherein the data is associated with the first code.

18. The controller of claim 16, wherein the metadata is associated with the second code.

19. The controller of claim 15, wherein selecting the error detection and correction code conditions a length of a word stored in the non-volatile memory.

20. The controller of claim 15, wherein the controller is further configured to:
detect and correct, errors in the information stored in the non-volatile memory based on the selected error detection and correction code.

* * * * *